United States Patent [19]

Bell, Jr. et al.

[11] 4,151,388
[45] Apr. 24, 1979

[54] CURRENT CONTROL SYSTEM FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 797,327

[22] Filed: May 16, 1977

[51] Int. Cl.² ............................................... B23P 1/08
[52] U.S. Cl. .................................. 219/69 C; 219/69 P; 323/80
[58] Field of Search ................ 219/69 C, 69 M, 69 G, 219/69 P; 323/80, 81; 219/130.21; 328/115, 116, 117, 119

[56] References Cited

U.S. PATENT DOCUMENTS

| | | | |
|---|---|---|---|
| 3,655,936 | 4/1972 | Saito et al. | 210/69 C |
| 3,809,848 | 5/1974 | Bell | 219/69 C |
| 3,896,368 | 7/1975 | Rym | 323/80 |
| 3,974,357 | 8/1976 | Saito et al. | 219/69 C |
| 3,987,269 | 10/1976 | Inoue et al. | 219/69 C |
| 3,995,137 | 11/1976 | Okada et al. | 219/130.21 |
| 4,029,924 | 6/1977 | Brokaw | 323/80 |

FOREIGN PATENT DOCUMENTS 1942754  3/1971  Fed. Rep. of Germany ............. 323/80

*Primary Examiner*—Bruce A. Reynolds
*Attorney, Agent, or Firm*—Harry R. Dumont

[57] ABSTRACT

A current selection and control system for providing uniform steps of machining current magnitude through a plurality of output modules all coupled to a common gap terminal and having individual amplifier stages. The current magnitude output of the modules is weighted in accordance with a binary code so that selection may be made directly through a binary thumbwheel switch and a gating system to enable selected amplifier stages and their associated modules.

13 Claims, 2 Drawing Figures

CURRENT CONTROL SYSTEM FOR ELECTRICAL DISCHARGE MACHINING APPARATUS

BACKGROUND OF THE INVENTION

The electrical discharge machining art has advanced from the early stages in which relaxation oscillators were used to provide machining power pulses to the gap for eroding portions of an electrically conductive workpiece in the pattern of a tool electrode. Independently timed and controlled pulse generators such as multivibrators are now almost universally used and in these generators the electronic switches employed are generally in the form of solid state switches, particularly transistors. In the electrical discharge machining process, it is necessary as the workpiece material is removed, that a predetermined gap be maintained between the tool electrode and the workpiece through an automatic servo feed system which provides a continuous advance into and toward the workpiece as the material removal is carried out. During the electrical discharge machining process, a fluid coolant, generally a liquid, is circulated and recirculated through the machining gap to flush the workpiece particles from the gap. The coolant is usually furnished under pressure by a pump through one or more openings provided in the electrode. One necessary and defining characteristic of electrical discharge machining is that the coolant be a dielectric fluid such as kerosene, transformer oil, distilled water, or the like. The dielectric fluid, as broken down in minute, localized areas by the action of the machining power pulses passing between the closely opposed surfaces of the tool electrode and workpiece. For control of the servo feed system, there is generally utilized an electrical signal from the machining gap in order to control the rate and the direction of servo feed. In most cases, this gap signal is compared to an adjustable reference voltage so that the operator can select the rate of servo feed desired for the particular operating conditions at hand.

In order to control machining rate and overcut as well as finish, it is necessary that the operator and his equipment have the ability to precisely control the magnitude of current being passed to the gap in the form of machining power pulses. In some prior art systems, the level of current was controlled by adjustment in the multivibrator of on-off time so that the actual machining power magnitude was controlled by the duty factor or ratio of on-time to off-time of the pulses. In other arrangements, there were provided relay switches which, in accordance with operator selection, could couple any of a number of output switches to the gap and in this manner increase or decrease the magnitude of the machining power being furnished to the gap. In still other prior art arrangements, a bank of resistors were included connectible in series with the gap. Different magnitude resistors or combinations of resistors were switched in either manually or by relays thus to control the current magnitude of machining power pulses.

The known prior art arrangements just discussed for controlling machining current were subject to many disadvantages, particularly by reason of the difficulty in maintaining uniform steps of current over a broad range. Also, those systems using mechanical or electro-mechanical switching elements were both complex to build, difficult to service, and expensive in their original cost. By way of summary, it will be seen that prior art arrangements for controlling magnitude of machining current were subject to a number of disadvantages.

It will be understood hereinafter in the specification that when I refer to "electronic switch", I mean any electronic control device having three or more electrodes comprising at least two principal or power conducting electrodes acting to control current flow in the power circuit, the conductivity between the principal electrodes being controlled by a control electrode within the switch whereby the conductivity of the power circuit is controlled statically or electrically without movement of mechanical elements within the switch. Included within the definition are transistors in which turn-on is accomplished by a control voltage applied to the transistor control electrode and in which turn-off is accomplished automatically in response to removal of that control voltage. Also included in the definition are electronic devices of the gate type in which turn-on is accomplished by a control voltage applied to the control electrode, which control voltage may be then removed and in which turn-off is accomplished by application of a subsequent control voltage to the control electrode. An additional class of electronic switches called "electronic trigger devices", falls within this definition and includes ignitrons, thyratrons, semiconductor control rectifiers, and the like. By "electronic trigger device", I mean any electronic switch of the type which is triggered on at its control electrode by a pulse and is then turned off by a reverse voltage applied for a sufficient time across its principal electrodes.

SUMMARY OF THE INVENTION

The present invention provides a simple and direct current control system in which the different magnitudes of current level are selected through a low-power gating system. The present invention thus eliminates the need for mechanical or electromechanical switching. The steps of current magnitude are held precisely uniform by the selection of fixed components in a plurality of different weighted current value output modules. The selection of the different current magnitude levels is made by turn-off of certain of the amplifier sections associated with certain of the output modules through the gating system just mentioned. It is possible to select the current level on the console of the EDM power supply by a thumbwheel four bit binary switch which switch then gives a clear and visible indication of the preselected value of current.

BRIEF DESCRIPTION OF THE DRAWINGS

In the drawings in which like reference numerals have been used to designate like parts herein referred to throughout the several views and in the appended specification.

DETAILED DESCRIPTION OF THE PREFERRED EMBODIMENT

Figure 1:
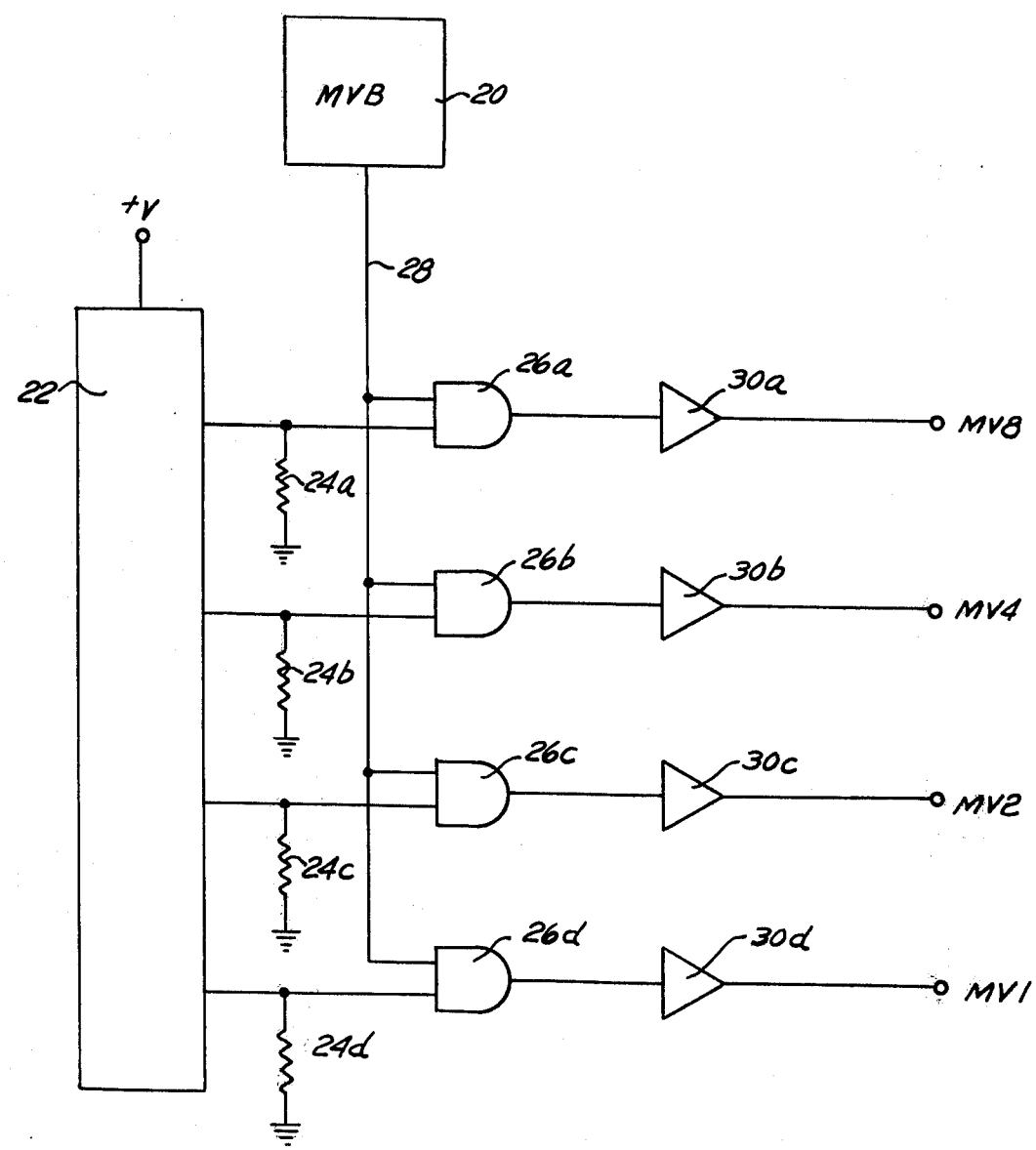
FIG. 1 is a combined schematic and block diagramatic showing of the multivibrator and the associated gates involved in the control system.
Figure 2:
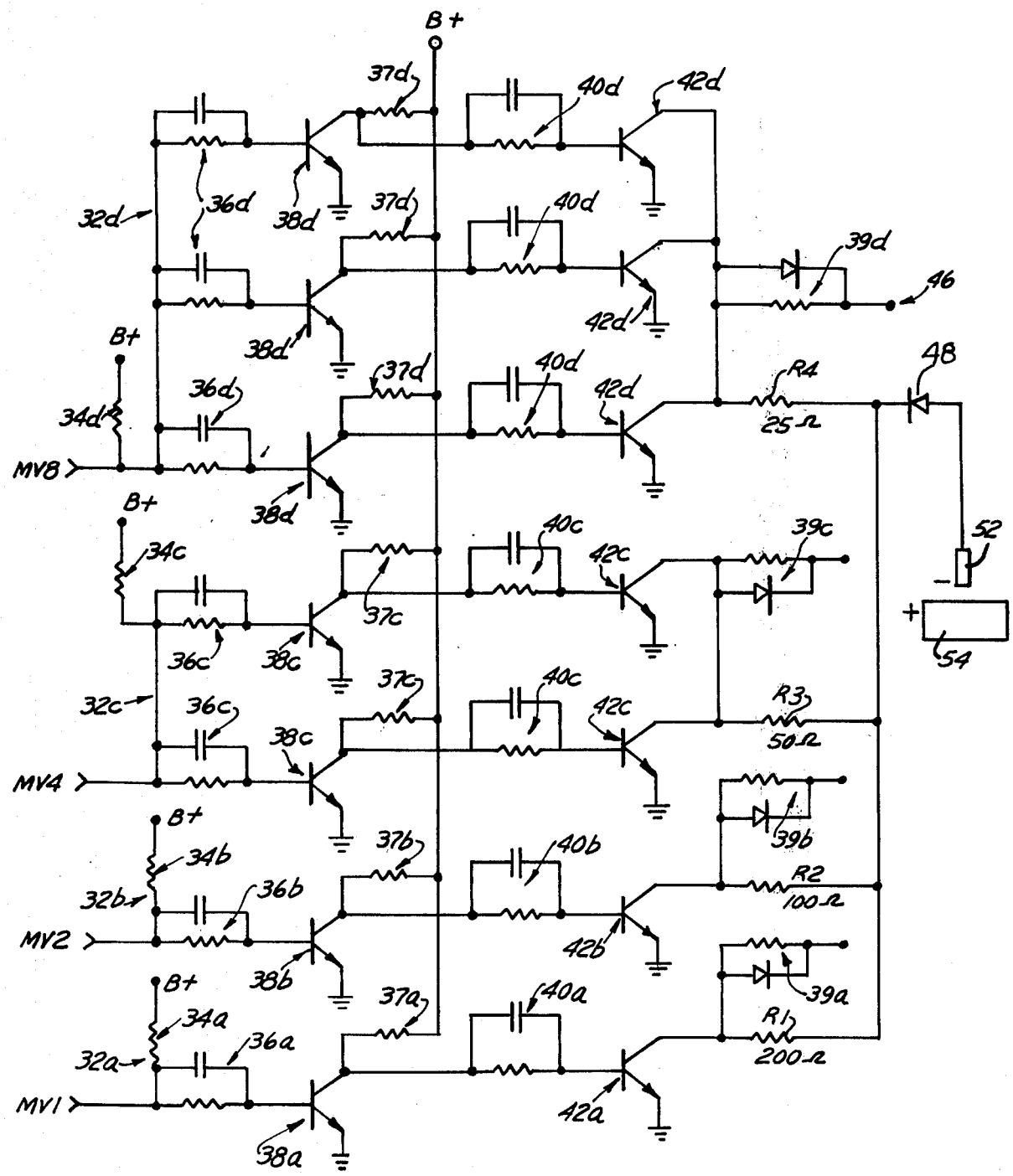
FIG. 2 is a schematic drawing showing how the several different binary weighted outputs of the FIG. 1 circuit are used to switch selected output modules into operating condition in accordance with the value of current selected.

FIG. 1 shows the multivibrator 20 which is used to generate triggering pulses to operate the output modules of the FIG. 2 drawing. The multivibrator 20 may either be a free-running multivibrator or a digital-type multivibrator of the type known in the electrical discharge machining art. The switch used to manually set the desired value for current is a binary switch 22 which has fifteen different current limit positions, all of equal weight. The binary switch 22 has its common connected to a positive voltage source V+. The four bit output lines from the switch 22 are all normally grounded each through a different resistor 24a, 24b, 24c, and 24d. A set of and-gates 26a, 26b, 26c, and 26d are next provided. Each of the gates 26a through 26d has its upper input terminal connected to the common pulse output line 28 from the multivibrator 20. The and-gates 26a–26d further each has its lower input terminal connected to a respective one of the four output lines from the binary switch 22. A further amplification stage including amplifiers 30a, 30b, 30c, and 30d are connected in series in the output lines from the and-gates 26a–26d. The outputs from the FIG. 1 circuit are labeled MV1, MV2, MV4, and MV8 in accordance with the current weight assigned to each line. The above-named outputs are correspondingly lettered in FIG. 2 as the four input lines to the FIG. 2 circuit. The four different output modules, starting from bottom to top, are indicated by the numerals 32a, 32b, 32c, and 32d. Now with respect to the module 32a, it includes a B+ source of operating potential and series resistor 34a, an RC wave-shaping network 36a, an amplifier transistor 38a, an intermediate wave-shaping RC network 40a, and an output transistor 42a which is connected to a common for the gap through a resistor $R_1$. The final portion of the gap circuit is shown at the right-hand edge of the drawing and includes a main DC power source 46, a blocking diode 48, and the two gap elements include a tool electrode 52 and a workpiece 54 having the plus-minus polarity as shown. In one high voltage embodiment of a power supply, the positive voltage applied from the source 46 would be of the order of 250 volts. With respect to the lowermost module 32a, a common B+ voltage source is connected through a resistor 37a to the collector of the transistor 38a. A further diode resistor network 39a is connected between the positive voltage source 46 and the collector of the output transistor 42a.

The second module 32b, in a like manner to the one just described, includes a separate B+ voltage and a resistor 34b, a wave-shaping RC network 36b, an amplifier transistor 38b, and a resistor 37b connected between the collector of the amplifier transistor 38b and a common B+ voltage source. Also included is a wave-shaping RC network 40b connected in the base lead of an output transistor 42b. A resistor R2 is connected between the collector of the output transistor 42b and the common leading to the negative gap terminal through the diode 48. A further parallel resistor diode network 39b is connected in circuit as shown.

The next output module 32c will be seen to include two amplifier transistors 38c and two wave-shaping RC networks 36c. The collectors of the amplifier transistors 38c are connected to a common B+ potential through resistors 37c. A pair of second RC wave-shaping networks 40c are included, each coupled in the base lead of its associated output transistor 42c. A series resistor R3 is connected in the output taken from the collectors of both the transistors 42c. A similar resistor diode blocking network 39c is connected between the positive voltage source 46 and the collectors of the two output transistors 42c.

The uppermost of the four output modules 32d will be seen to contain three amplifier transistors 38d, each having an associated RC wave-shaping network 36d connected in its base lead. Each transistor 38d further has a resistor 37d connected between its collector and a common B+ source. A second set of wave-shaping networks 40d are connected in the base leads of each of the three output transistors 42d and the output from the collectors of the three transistors 42d are passed through a fixed resistor R4 to the negative gap terminal. A further diode resistor network 39d is connected in series between the positive voltage source 46 and the respective collectors of the three output transistors 42d. Again it is noted that each of the different amplifier stages is capable of operating independently of the others.

In one exemplary embodiment of our invention, the lowermost resistor R1 would have a value of 200 ohms, the second resistor R2 would have a value of 100 ohms, the resistor R3 would have a value of 50 ohms, and the resistor R4 a magnitude of 25 ohms. It would now be seen that in accordance with the selection by the thumbwheel binary switch 22, there will be provided an enabling of current outputs in accordance with the code for the current limit selected with an output at one or more of the terminals labeled MV1, MV2, MV4, or MV8. In this manner, combinations would be selected of the current value weighted output modules 32a, 32b, 32c, and 32d. Those particular output modules not selected would simply have its amplifier stage not enabled in accordance with the code. Low-power gating rather than high-power gating is achieved. Our current control system thus provides uniform increments of current readily controlled and preset by the operator. It is further noted that each of the amplifier transistors 38a–d contains in its input lead the RC network 36a–d, respectively, to decrease the turn-on time and decrease the storage time of the transistors being switched. The networks 40a–40d perform a like function in the switching of the output transistors 42a through 42d.

It will thus be seen that we have provided by our invention a novel and improved current selection system for EDM.

We claim:

1. A current control system for electrical discharge machining across a dielectric coolant filled gap, comprising:
    a multivibrator for providing a triggering pulse output;
    a plurality of current output modules, each coupled to a common terminal of the gap, each of said modules having a different weighted current output value;
    a like plurality of amplifiers, each associated with a different one of said modules, each of said amplifiers operable independent of the others;
    a gating means connected intermediate the output of said multivibrator and said amplifier inputs; and
    an encoded switch of the visual readout type for enabling certain of the gating means and selected ones of the amplifiers and their associated modules, in accordance with their weighted values.

2. The combination as set forth in claim 1 wherein said switch is a thumbwheel switch of the binary coded type.

3. The combination as set forth in claim 2 wherein said amplifiers and modules are each four in number and said modules are weighted in the current output ratio of 1:2:4:8 whereby the total current output is variable in fifteen uniform increments.

4. The combination as set forth in claim 1 wherein the weighted current output values of said modules are a function of their fixed electrical components.

5. The combination as set forth in claim 1 wherein said gating means comprises a like plurality of and-gates, each having a pair of input terminals, one connected to the pulse output of said multivibrator and the other connected to one of four outputs of said encoded switch.

6. The combination as set forth in claim 1 wherein said modules each include at least one output transistor switch, said output transistors all having their principal electrodes operably coupled to a common voltage source.

7. The combination as set forth in claim 6 wherein said output transistors all have a corresponding principal electrode coupled to a common gap terminal through a blocking diode.

8. The combination as set forth in claim 6 wherein each of said output transistors includes in its input lead an RC network for decreasing its turn-on and storage time.

9. A current control system for electrical discharge machining across a dielectric coolant filled gap, comprising:

- a multivibrator for providing a triggering pulse output;
- a plurality of independently operable current output modules connected to the gap, each operable with a different weighted current output value;
- a gating means connected intermediate the output of said multivibrator and said modules for enabling certain of said modules im accordance with a predetermined assigned weight; and
- an encoded switch of the visual readout type for controlling the operation of said gating means in accordance with said assigned weight.

10. The combination as set forth in claim 9 wherein said switch is of the binary coded thumbwheel type and said weighted current output values of said modules are in the ratio of 1:2:4:8.

11. The combination as set forth in claim 9 wherein said gating means comprise a like plurality of and-gates, each having one input terminal connected to the pulse output from the multivibrator and the other input terminal connected to one of four outputs of said switch.

12. The combination as set forth in claim 9 wherein each of said modules includes at least one output transistor, said transistors all connected to a common DC voltage source.

13. The combination as set forth in claim 12 wherein each of said output transistors includes an RC network connected in its input for decreasing its turn-on and storage time.

* * * * *